INVENTOR.
HUGH K. HOWERTON
BY Herman L. Gordon
ATTORNEY

June 4, 1963   H. K. HOWERTON   3,092,722
SPECTRO-PHOSPHORESCENCE MEASURING INSTRUMENT
Filed Feb. 25, 1960   2 Sheets-Sheet 2

INVENTOR.
HUGH K. HOWERTON
BY Herman L. Gordon
ATTORNEY

United States Patent Office 3,092,722
Patented June 4, 1963

3,092,722
SPECTRO-PHOSPHORESCENCE MEASURING
INSTRUMENT
Hugh K. Howerton, Silver Spring, Md., assignor to American Instrument Company, Inc., Silver Spring, Md.
Filed Feb. 25, 1960, Ser. No. 11,092
16 Claims. (Cl. 250—77)

This invention relates to spectrometry, and more particularly to an instrument for exciting, resolving, measuring and recording spectra and decay curves of phosphorescences.

A main object of the invention is to provide a novel and improved apparatus for spectrometrically analyzing phosphorescent responses of materials and for determining the quantitative response of such materials to radiation.

A further object of the invention is to provide an improved spectro-phosphorescence measuring instrument which is relatively simple in construction, which is easy to operate, and which provides rapid quantitative assays of the phosphorescence of materials without being affected by the fluorescence of such materials.

A still further object of the invention is to provide an improved spectro-phosphorescence measuring instrument which involves relatively few parts, which covers substantially the entire range of visible radiation, and which is provided with means to eliminate the effects of scattered or fluorescent radiation.

A still further object of the invention is to provide an improved instrument for measuring the phosphorescence response of materials when excited by radiation, said instrument requiring the use of only a small sample of the material to be analyzed, being highly sensitive, and permitting the continuous activation of a sample and the measurement of resulting phosphorescence throughout the ultraviolet and visible regions.

A still further object of the invention is to provide an improved apparatus for spectrometrically analyzing phosphorescent materials, said apparatus being applicable for identifying and for quantitatively analyzing a wide range of phosphorescent materials and being of sufficient sensitivity so that materials which phosphoresce with relatively low intensity can be readily identified and analyzed.

A still further object of the invention is to provide an improved spectrophosphorimeter which is provided with means for successively exciting a sample with all the spectral components of white light, for determining the characteristic wavelength or wavelengths to which the sample has major phosphorescent response, and for quantitatively analyzing such major response for each of such excitation wavelengths, so that a complete quantitative assay of the phosphorescent properties of the sample may be obtained, and so that the material may be accurately identified.

A still further object of the invention is to provide an improved spectrophosphorimeter which includes means for exciting a sample with selected spectral components of radiation, for determining the characteristic wavelength or wavelengths at which the sample has major phosphorescent response, for determining the polarization of the phosphorescent response without interference from the fluorescent response of the material, and for quantitatively analyzing such responses for various excitation wavelengths.

Further objects and advantages of the invention will become apparent from the following description and claims, and from the accompanying drawings, wherein:

Certain molecules phosphoresce when excited by ultraviolet or other wavelengths of light, provided that these molecules are dispersed in a suitable medium. These phosphorescences are unique in regard to their spectral frequencies, lifetime and spectral vibrational patterns, and, as such, can be used to identify many of these molecules; furthermore, the phosphorescent intensity depends on the concentration and can serve as a basis for quantitative analysis.

This effect is to be distinguished from fluorescence, wherein the decay time of the generated radiation is relatively short as compared to the decay time for phosphorescence.

Many substances, when excited by radiation, fluoresce and phosphoresce substantially simultaneously, as well as produce light scattering effects, making it difficult to accurately analyze them by examination of the composite spectrum of the emission radiation thus produced. It is advantageous rather to limit the examination to the phosphorescence spectrum and to eliminate the effects of fluorescence and light scattering. Therefore, it is desirable to delay the examination of the emission radiation until substantially complete decay of the fluorescence has taken place, but while there is still substantial phosphorescent emission.

It has also been established that polarization effects occur in such substances as a result of excitation by the radiation. Thus, if the substance is excited with plane polarized radiation, the emission radiation will also be polarized, and in the case of relatively small molecules the emission radiation will usually be polarized with its electric vector parallel to that of the activating beam. However, in the case of complex molecules, the emission polarization will be a function of the size, shape, and chemical nature of the complex molecule.

As in the case of excitation by non-polarized radiation, the polarization effects include those for both fluorescence and phosphorescence, and for the same reasons given above, it is desirable in many cases to confine the analysis to the study of the polarization effects in the phosphorescent emission.

Quantitatively, the polarization P may be defined as follows:

$$P = \frac{F_\parallel - F_\perp}{F_\parallel + F_\perp}$$

where $F_\parallel$ is the phosphorescent (or fluorescent) intensity measured with the polarizing and analyzing prisms oriented with electric vectors parallel and $F_\perp$ is the intensity measured with the prisms crossed. The polarization P is directly related to the parameters of the molecule under study.

Figure 1:
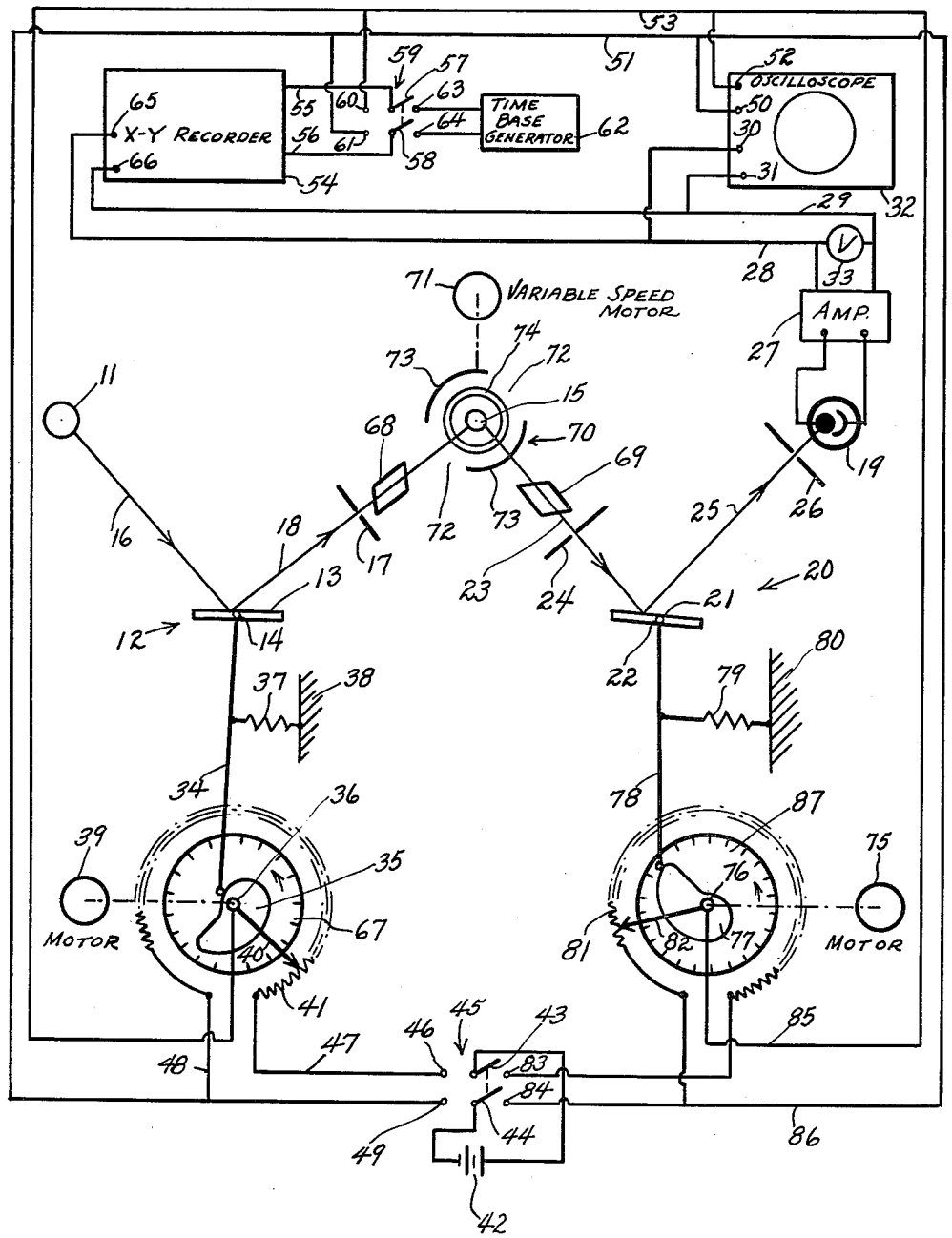
FIGURE 1 is a schematic diagram illustrating the optical arrangement and basic electrical connections of an improved spectrophosphorimeter constructed in accordance with the present invention.

Referring to the drawings, FIGURE 1 diagrammatically illustrates one form of apparatus according to this invention for analyzing substances in accordance with the principles above stated. Designated at 11 is a suitable source of excitation radiation, which may comprise, for example, a mercury lamp. Alternatively, the source 11 may comprise a white light source.

The emission from the source 11 is dispersed by a grating monochromator, designated generally at 12. Monochromator 12 comprises a reflectance grating 13 which is pivotally mounted on a suitable support, not shown, for oscillation around a vertical axis, for example, on a vertical shaft 14. Grating 13 is located forwardly of and between the lamp 11 and the sample cell, shown at 15, so as to receive a beam 16 of radiation and to disperse said beam and reflect the spectral components thereof toward the cell 15. A vertical slit plate 17 is provided in front of the cell 15 so that only one spectral component image of the radiation source may enter the cell 15 through the plate 17 at any given position of reflectance grating 13. The beam carrying the reflected spectral component image is designated at 18 in FIGURE 1.

Designated at 19 is a photo-sensitive electron device of any suitable type, such as a photo-electric cell, a photomultiplier tube, or the like, which is suitably mounted on the side of cell 15 opposite the lamp 11, as shown. A second grating monochromator 20 is provided between the cell 15 and the photo-sensitive device 19, comprising a reflectance grating 21 pivoted for oscillation on a vertical axis, being secured, for example, on a vertical shaft 22 located forwardly of and between cell 15 and the photo-sensitive device 19. Grating 21 is located to receive a beam 23 of radiation from cell 15 through a vertical slit plate 24 provided in front of the cell but being substantially at right angles to the slit plate 17. The photo-sensitive device 19, for example, a photo-cell as illustrated, is located to receive on its cathode a spectral component beam 25 reflected from the reflectance grating 21 through a vertical slit plate 26 provided in front of the photo-cell, as shown.

The photo-sensitive device 19 is electrically connected to the input of a suitable amplifier 27 of a conventional type, arranged to develop an output voltage across its output conductors 28, 29 whose magnitude varies in accordance with the intensity of the spectral component beam 25 incident on the cell 19. The conductors 28, 29 are respectively connected to the vertical deflection plate terminals 30, 31 of a cathode ray oscilloscope 32, whereby the vertical deflection of the cathode beam of the oscilloscope will also vary in accordance with the intensity of the spectral component beam 25.

A voltmeter 33 is connected across the output conductors 28, 29 of amplifier 27 so that the value of the amplifier output voltage may be read at any time.

Reflectance gratings 13 and 21 are of conventional construction, and may comprise plane reflectance gratings similar to Catalogue No. 33-53-08-26, manufactured by Bausch & Lomb Optical Co., Rochester, N.Y.

Grating 13 is provided with an actuating arm 34, rigidly secured thereto and extending forwardly therefrom, as viewed in FIGURE 1, the end of the arm slidably engaging the periphery of a driving cam 35 secured on a vertical shaft 36 journalled in a suitable support. Arm 34 is biased against the periphery of the cam, namely, in a counterclockwise direction, as viewed in FIGURE 1, by a spring 37 connected between the arm and a stationary support 38. Cam 35 is contoured to rotate reflectance grating 13 at a substantially uniform rate through an angle sufficient to reflect all the visible and ultraviolet spectral components of beam 16 to the vertical slit in plate 17 and then to rapidly allow the grating to return to its starting position under the biasing force of spring 37, in response to the counterclockwise rotation of shaft 36, as viewed in FIGURE 1, at a uniform rate.

Shaft 36 is suitably coupled to the shaft of an electric motor 39 of any suitable type, preferably of a slow-speed type having a nominal speed of about four revolutions per minute. Conventional means, not shown, may be provided to manually regulate the speed of motor 39.

The horizontal sweep of the oscilloscope beam is synchronized with the oscillation of the reflectance grating 13 by a contact arm 40 secured to shaft 36 which slidably engages a potentiometer winding 41 mounted concentrically with shaft 36. A battery 42 is connected across the poles 43, 44 of a double-pole, double-throw switch 45. The positive switch pole 43 is engageable with a stationary contact 46, which, in turn, is connected by a wire 47 to one terminal of the potentiometer winding 41. The remaining terminal of the winding 41 is connected by a wire 48 to stationary switch contact 49, engageable by the negative switch pole 44. One of the horizontal sweep terminals 50 of the oscilloscope is connected by a wire 51 to the switch contact 49. The other sweep terminal 52 is connected by a wire 53 to the contact arm 40.

Designated at 54 is an X-Y recorder, whose X (time base) terminal wires 55 and 56 are connected respectively to the poles 57 and 58 of a double-pole, double-throw switch 59. A first pair of stationary switch contacts 60 and 61, engageable by said poles, are connected respectively to the horizontal sweep wires 53 and 51, so that the arm 40 and potentiometer winding 41 may be employed to generate the time base signal for the recorder 54, as well as the horizontal sweep signal of oscilloscope 32. An independent time base signal generator 62 has its output terminals connected to the second pair of stationary switch contacts 63 and 64, optionally engageable by the switch poles 57 and 58, so that the time base generator 62 may at times be employed as the time base signal source for recorder 54.

The vertical deflection terminals 65 and 66 of the recorder 54 are connected to the output conductors 28 and 29 of amplifier 27.

With switch poles 43 and 44 engaging contacts 46 and 49, the horizontal sweep voltage on wires 53 and 51 decreases from the maximum positive voltage of battery 42 to zero as cam 35 rotates counterclockwise, as viewed in FIGURE 1, namely, simultaneously with the clockwise rotation of reflectance grating 13. At the end of the scanning movement of the grating, cam 35 causes it to rapidly return to its starting position, and at the same time, arm 40 applies maximum positive battery voltage to the sweep wires 53, 51.

Cam 35 is provided with a calibrated wave length disc 67, indicating the wave length of the monochromatic beam 18 in the different angular positions of the grating 13. Disc 67 may be employed to manually set the grating for a particular excitation wave length (with motor 39 deenergized).

From the foregoing description it will be apparent that reflectance grating 13 and the elements associated therewith comprise a means to disperse the spectral components of beam 16 and to reflect said components toward the cell 15 through the slit plate 17, whereby the cell may be activated either by being scanned successively by all the spectral components of the source 11, when motor 39 is energized, or by a selected monochromatic spectral component, when motor 39 is deenergized and the cam disc 67 is manually set to provide said desired spectral component in the manner above described.

A polarizing prism 68 is mounted in the path of beam 18 between the slit plate 17 and the cell 15. An analyzing prism 69 is mounted in the path of the emission beam 23 between cell 15 and the slit plate 24.

Designated at 70 is a vertical slotted cylinder which surrounds cell 15 concentrically therewith and which is rotated continuously by a suitable driving motor 71 coupled thereto. As is diagrammatically illustrated in FIGURE 1, the cylinder 70 is formed with opposing slots 72, 72. The imperforate wall portions 73, 73 of the cylinder 70 are of sufficient circumferential length (in relation to the speed of rotation of the cylinder) to allow the fluorescent emission from the sample to substantially decay before the sample is exposed to the analyzing prism 69 and the exit slit plate 24, but, since the phosphorescent emission has a much longer decay time, to permit phosphorescent emission to reach prism 69 and split plate 24. Also, the imperforate cylinder wall portions 73 are of sufficient circumferential length to cut off the excitation beam 18 before a slot 72 of the cylinder moves into a position exposing the cell to the prism 69 and the exit slit plate 24, thus preventing scattered radiation (which is present in the sample only during excitation) from leaving the cell in the exit beam 23.

The driving motor 71 is preferably provided with suitable speed regulating means to adjust the masking period of the imperforate portions 73 of cylinder 70 with respect to the exit path defined by exit slit plate 24.

In a typical embodiment of the invention, the imperforate wall portions 73 of the cylinder 70 subtended angles of 108°, and the motor 71 was arranged to rotate the cylinder 70 in a range between 1000 and 5000 r.p.m.

The cell 15 is preferably arranged to accept a quartz Dewar flask 74, permitting the sample to be kept submerged in liquid nitrogen during excitation.

Figure 2:
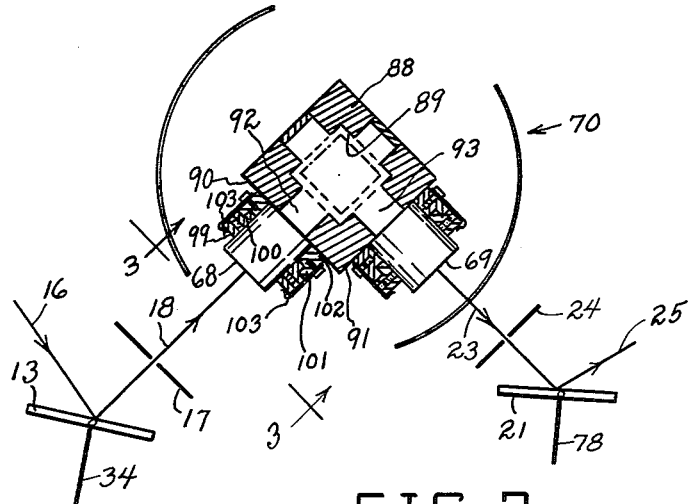
FIGURE 2 is a horizontal cross-sectional view taken through a sample holder provided with polarizers, which may be employed in a spectrophosphorimeter constructed in accordance with the present invention.
Figure 3:
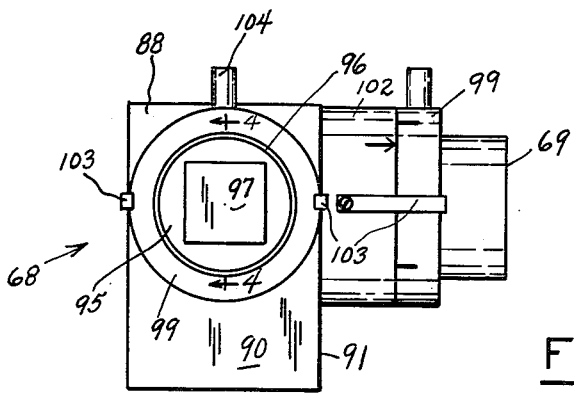
FIGURE 3 is an elevational view of the polarizing sample holder of FIGURE 2, taken on the line 3—3 of FIGURE 2.
Figure 4:
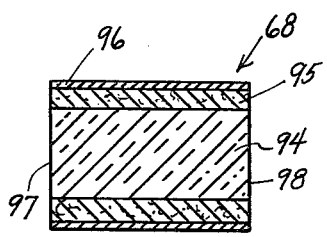
FIGURE 4 is a vertical cross-sectional detail view taken on the line 4—4 of FIGURE 3.

As illustrated diagrammatically in FIGURE 2, the polarizing prisms may be included inside the rotating cylinder 70, and may be mounted in the same unitary assembly with the sample cell, as will be presently described.

The reflectance grating 21 is provided with driving means similar to that associated with the grating 13, namely, a drive motor 75 coupled to a driving shaft 76 to which is secured a grating drive cam 77 whose periphery is slidably engaged by the end of an arm 78 rigidly secured to the pivot shaft 22 of grating 21. Cam 77 is similar to cam 35 and drives grating 21 in the same manner as grating 13 is driven. A biasing spring 79 is connected between arm 78 and a stationary support 80, urging arm 78 against the periphery of cam 77, biasing the grating 21 towards its starting position, and the cam 77 is contoured to return grating 21 rapidly toward said starting position at the end of the clockwise scanning swing of the grating, as viewed in FIGURE 1.

The horizontal sweep of the oscilloscope beam is synchronized with the scanning movement of grating 21 by the provision of a sweep potentiometer winding 81 arranged concentrically with shaft 76 and slidably engaged by a contact arm 82 connected to shaft 76. The potentiometer winding 81 is connected to the respective stationary contacts 83 and 84 of switch 45 so as to be connected to battery 42 when the switch poles 43 and 44 engage contacts 83 and 84. Arm 82 is connected by a wire 85 to the wire 53, and thus to the horizointal sweep terminal 52 of oscilloscope 32. Switch contact 84 is connected by a wire 86 to the wire 51 and thus to horizontal sweep terminal 50.

Cam 77 is provided with a calibrated wave length disc 87 similar to the wave length disc 67, indicating the wavelength of the beam 25 in the different angular positions of the grating 21. Disc 87 may be employed to manually set the grating 21 for a particular emission wave length (with motor 75 deenergized). Motor 75 is preferably provided with suitable speed regulating means, not shown.

It will be apparent from the foregoing description that reflectance grating 21 and the elements associated therewith comprise a means to disperse the spectral components of the phosphorescent beam 23 and to reflect said components to the cathode of photo-sensitive device 19 through the slit plate 26, whereby the photo-sensitive device may be excited either by being scanned successively by the spectral components of the phosphorescent emission from the sample cell 15, when motor 75 is energized, or by a selected monochromatic spectral component of the phosphorescent emission when motor 75 is deenergized and the cam disc 87 is manually set to provide said desired spectral component.

The oscilloscope 32 is preferably of a type having a long-persistence phosphor viewing screen, although if rapid scanning speeds are employed for the gratings 13, 21, the oscilloscope screen may be of a shorter-persistence type.

Referring to FIGURES 2, 3 and 4, 88 designates a sample cell holder which may be employed in the apparatus of FIGURE 1. The cell holder 88 comprises a generally rectangular block formed with a suitable square cavity 89 adapted to receive a Dewar flask containing the sample to be analyzed and permitting the sample to be kept submerged in liquid nitrogen during excitation, as above stated. The respective polarizing and analyzing prisms 68 and 69 are rotatably mounted on the adjacent faces 90 and 91 of the cell holder block 88 in axial alignment with the excitation radiation admission port 92 and the emission radiation exit port 93 provided in the walls of the block associated with said faces 90 and 91.

The prism 68 comprises a body of transparent polarizing material 94 which is of square cross-section and which is embedded in black plaster of Paris 95 contained in a cylindrical metal shell 96, the prism body being disposed coaxially with said cylinder and being exposed at its square opposite end faces 97 and 98. The cylinder 96 is secured in a collar 99 which is formed with a reduced annular inner end portion 100 which is rotatively received inside an annular flange 101 formed on a stationary collar member 102 secured to face 90 concentrically with the port 92. Thus, the inner end portion of shell 96 is rotatably received in the stationary collar member 102. A pair of diametrically opposed hook-like retaining springs 103, 103 are secured on the stationary collar member 102 and engage around the rotatable collar member 99, holding collar 99 against flange 101 but allowing said collar 99 to be manually rotated. A radial pin 104 is secured to and projects outwardly from collar 99 for rotating same. Suitable index markings 90° apart are provided on collar 99, and a reference index mark is provided on the stationary collar member 102, to establish the position of the electric vector of the polarizing material 94.

The analyzing prism 69 comprises an assembly similar to that of the polarizing prism 68.

In using the apparatus, after a suitable activating wave length has been located by the actuation of the reflectance grating 13, motor 75 is energized to scan the phosphorescent emission from the sample, with the polarizing prisms 68 and 69 set with their electric vectors parallel. When a peak emission intensity is observed, the motor 75 may be stopped and the cam disc 87 may be manually adjusted to maximize the peak intensity so that it can be read. This gives the value of $F_\parallel$ in the above equation. The analyzing prism 69 is then manually rotated to the position thereof which is crossed with respect to the polarizing prism 68, and the resulting intensity, corresponding to $F_\perp$ is then read. The polarization P may then be calculated from the equation $$P = \frac{F_\parallel - F_\perp}{F_\parallel + F_\perp}$$

providing the desired information relating to the parameters of the molecule under study.

Obviously, if it is not desired to isolate the phosphorescent emission from the other emission components of the sample, the rotating cylinder 73 may be omitted, and the apparatus may be employed simply as a polarizing spectrofluorimeter.

While certain specific embodiments of a spectrophosphorimeter have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an apparatus for measuring the phosphorescent response of a material independently of its fluorescent response, a source of monochromatic excitation radiation, a stationary sample cell adapted to contain the material and retain it in a stationary condition, means directing radiation from said source to said cell, an emission monochromator mounted in the path of phosphorescent emission from said cell, a photo-sensitive device mounted in a position to receive a selected spectral component of the phosphorescent emission from said monochromator, and means to introduce a time delay between the reception of a predetermined amount of radiation from said source by said cell and the reception of the resultant emission radiation from the cell by said monochromator, said time delay being sufficient to allow fluorescent emission to substantially decay.

2. In an apparatus for measuring the phosphorescent response of a material independently of its fluorescent response, a source of monochromatic excitation radiation, a stationary sample cell adapted to contain the material and retain it in a stationary condition, means to admit sequential pulses of radiation from said source to said cell, said pulses being separated by a predetermined blanking period, an emission monochromator mounted in the path of phosphorescent emission from said cell, a photo-sensitive device mounted in a position to receive a selected spectral component of the phosphorescent emission from said monochromator, and means to transmit sequential pulses of emission radiation from the cell to said monochromator only during said blanking period and commencing a sufficient length of time after the beginning of the blanking period to allow fluorescent emission to substantially decay.

3. In an apparatus for measuring the phosphorescent response of a material independently of its fluorescent response, a stationary sample cell adapted to contain the material and retain it in a stationary condition, means to direct a pulse comprising a predetermined quantity of excitation radiation into said cell, photo-sensitive means, and means to direct a selected spectral component of resultant emission radiation from said cell to said photo-sensitive means at a time sufficiently subsequent to the termination of said pulse to allow fluorescent emission to substantially decay.

4. In an apparatus for measuring the phosphorescent response of a material independently of its fluorescent response, a stationary sample cell adapted to contain the material and retain it in a stationary condition, means to direct a pulse comprising a predetermined quantity of excitation radiation into said cell, photo-sensitive means, means to direct a selected spectral component of resultant emission radiation from said cell to said photo-sensitive means, and means to delay the exposure of said photo-sensitive means to said emission radiation for a sufficient time to allow fluorescent emission to substantially decay.

5. In an apparatus for measuring the phosphorescent response of a material independently of its fluorescent response, a stationary sample cell adapted to contain the material and retain it in a stationary condition, means to direct a pulse comprising a predetermined quantity of excitation radiation into said cell, photo-sensitive means, means to direct a selected spectral component of resultant emission radiation from said cell to said photo-sensitive means, means to delay the exposure of said photo-sensitive means to said emission radiation for a sufficient time to allow fluorescent emission to substantially decay, a polarizing prism in the path of the excitation radiation, and an analyzing prism in the path of the emission radiation.

6. In an apparatus for measuring the phosphorescent response of a material independently of its fluorescent response, a transparent stationary sample cell adapted to contain the material and retain it in a stationary condition, an apertured masking member surrounding said cell, a source of excitation radiation adjacent said cell external to said masking member, photo-sensitive means located to receive emission radiation from said cell through said masking member, a monochromator in the path of said emission radiation to select a predetermined spectral component thereof, and means to rotate said masking member at a speed to mask the emission radiation from said photo-sensitive means long enough to allow fluorescent emission to substantially decay while phosphorescent emission continues, said masking member being constructed and arranged to isolate the cell from said source during the exposure of the cell to said photo-sensitive means.

7. In an apparatus for measuring the phosphorescent response of a material independently of its fluorescent response, a transparent stationary sample cell adapted to contain the material and retain it in a stationary condition, an apertured masking member surrounding said cell, a source of excitation radiation adjacent said cell external to said masking member, photo-sensitive means located to receive emission radiation from said cell through said masking member, a monochromator in the path of said emission radiation to select a predetermined spectral component thereof, means to rotate said masking member at a speed to mask the emission radiation from said photo-sensitive means long enough to allow fluorescent emission to substantially decay while phosphorescent emission continues, said masking member being constructed and arranged to isolate the cell from said source during the exposure of the cell to said photo-sensitive means, a polarizing prism between said source and the cell, and an analyzing prism between the cell and said photo-sensitive means.

8. In an apparatus for measuring the phosphorescent response of a material independently of its fluorescent response, a transparent stationary sample cell adapted to contain the material and retain it in a stationary condition, a slotted masking cylinder surrounding the cell, a source of excitation radiation adjacent the cell, a first monochromator between the source and the cell to select a predetermined spectral component of excitation radiation, photo-sensitive means located to receive emission radiation from said cell through a slot in the masking cylinder, a second monochromator in the path of said emission radiation to select a predetermined spectral component thereof, and means to rotate said cylinder at a speed to mask the emission radiation from said second monochromator long enough to allow fluorescent emission to substantially decay while phosphorescent emission continues, the transmission slot being sufficiently small circumferentially to isolate the cell from the excitation radiation during the exposure of the cell to said second monochromator.

9. In an apparatus for measuring the phosphorescent response of a material independently of its fluorescent response, a transparent stationary sample cell adapted to contain the material and retain it in a stationary condition, a slotted masking cylinder surrounding the cell, a source of excitation radiation adjacent the cell, a first monochromator between the source and the cell to select a predetermined spectral component of excitation radiation, photo-sensitive means located to receive emission radiation from said cell through a slot in the masking cylinder, a second monochromator in the path of said emission radiation to select a predetermined spectral component thereof, means to rotate said cylinder at a speed to mask the emission radiation from said second monochromator long enough to allow fluorescent emission to substantially decay while the phosphorescent emission continues, the transmission slot being sufficiently small circumferentially to isolate the cell from the excitation radiation during the exposure of the cell to said second monochromator, a polarizing prism between the first monochromator and the cell, and an analyzing prism between the cell and said second monochromator.

10. In an apparatus for measuring the phosphorescent response of a material independently of its fluorescent response, a transparent stationary sample cell adapted to contain the material and retain it in a stationary condition, a slotted masking cylinder surrounding the cell, a source of excitation radiation adjacent the cell, a first rotatable reflectance grating between the source and the cell mounted to select a predetermined spectral component of excitation radiation, photosensitive means located to receive emission radiation from said cell through a slot in the masking cylinder, a second rotatable reflectance grating in the path of said emission radiation mounted to select a predetermined spectral component thereof, and means to rotate said cylinder at a speed to mask the emission radiation from said second rotatable reflectance grating long enough to allow fluorescent emission to substantially decay while phosphorescent emission continues, the transmission slot being sufficiently small circumferentially to isolate the cell from the excitation radiation during the exposure of the cell to said second rotatable reflectance grating.

11. In an apparatus for measuring the phosphorescent response of a material independently of its fluorescent response, a transparent stationary sample cell adapted to contain the material and retain it in a stationary condition, a slotted masking cylinder surrounding the cell, a source of excitation radiation adjacent the cell, a first rotatable reflectance grating between the source and the cell mounted to select a predetermined spectral component of excitation radiation, photosensitive means located to receive emission radiation from said cell through a slot in the masking cylinder, a second rotatable reflectance grating in the path of said emission radiation mounted to select a predetermined spectral component thereof, means to rotate said cylinder at a speed to mask the emission radiation from said second rotatable reflectance grating long enough to allow fluorescent emission to substantially decay while phosphorescent emission continues, the transmission slot being sufficiently small circumferentially to isolate the cell from the excitation radiation during the exposure of the cell to said second rotatable reflectance grating, a polarizing prism between the first rotatable reflectance grating and the cell, and an analyzing prism between the cell and the second rotatable reflectance grating.

12. In an apparatus for measuring the phosphorescent response of a material independently of its fluorescent response, a transparent stationary sample cell adapted to contain the material and retain it in a stationary condition, a masking cylinder surrounding the cell and being formed with radiation-transmitting slot means, a source of excitation radiation adjacent the cell, a first monochromator between the source and the cell mounted to select a predetermined spectral component of excitation radiation, photo-sensitive means located to receive emission radiation from said cell through said slot means, a second monochromator in the path of said emission radiation mounted to select a predetermined spectral component thereof, and means to rotate said cylinder at a speed to mask the emission radiation from said second monochromator long enough to allow fluorescent emission to substantially decay while phosphorescent emission continues the radiation-transmitting slot means being sufficiently small circumferentially to isolate the cell from the excitation radiation during the exposure of the cell to said second monochromator.

13. In an apparatus for measuring the phosphorescent response of a material independently of its fluorescent response, a transparent stationary sample cell adapted to contain the material and retain it in a stationary condition, a masking cylinder surrounding the cell and being formed with radiation-transmitting slot means, a source of excitation radiation adjacent the cell, a first monochromator between the source and the cell mounted to select a predetermined spectral component of excitation radiation, photo-sensitive means located to receive emission radiation from said cell through said slot means, a second monochromator in the path of said emission radiation mounted to select a predetermined spectral component thereof, means to rotate said cylinder at a speed to mask the emission radiation from said second monochromator long enough to allow fluorescent emission to substantially decay while phosphorescent emission continues, the radiation-transmitting slot means being sufficiently small circumferentially to isolate the cell from the excitation radiation during the exposure of the cell to said second monochromator, a polarizing prism between the first monochromator and the cell, and an analyzing prism between the cell and said second monochromator.

14. In an apparatus for measuring the polarization of a phosphorescent material independently of fluorescence in the material, a stationary sample cell adapted to contain the material and retain it in a stationary condition, means to generate a pulse of excitation radiation and to direct said pulse into said cell, photo-sensitive means, means to direct resultant phosphorescent emission from said cell to said photo-sensitive means after a substantial time delay following the reception of the pulse of excitation radiation by the cell, a polarizing prism in the path of the excitation radiation, and an analyzing prism in the path of the phosphorescent emission.

15. In an apparatus for measuring the phosphorescent response of a material independently of its fluorescence, a stationary sample cell adapted to contain the material and retain it in a stationary condition, means to direct a pulse comprising a predetermined quantity of excitation radiation into said cell, photo-sensitive means, and means to direct resultant emission radiation from said cell to said photo-sensitive means at a time sufficiently subsequent to the termination of said pulse to allow fluorescent emission to substantially decay.

16. In an apparatus for measuring the polarization of a phosphorescent material independently of fluorescence in the material, a stationary sample cell adapted to contain the material and retain it in a stationary condition, means to direct a pulse comprising a predetermined quantity of excitation radiation into said cell, photo-sensitive means, means to direct resultant emission radiation from said cell to said photo-sensitive means at a time sufficiently subsequent to the termination of said pulse to allow fluorescent emission to substantially decay, a polarizing prism in the path of the excitation radiation, and an analyzing prism in the path of the resultant emission radiation.

References Cited in the file of this patent

UNITED STATES PATENTS

| | | |
|---|---|---|
| 2,240,844 | Goggin et al. | May 6, 1941 |
| 2,303,688 | Fearon | Dec. 1, 1942 |
| 2,351,539 | Peck | June 13, 1944 |
| 2,381,414 | Wilkie | Aug. 7, 1945 |
| 2,757,568 | Fastie | Aug. 7, 1956 |
| 2,794,945 | Celmer | June 4, 1957 |
| 2,825,817 | North | Mar. 4, 1958 |
| 2,837,655 | Lang | June 3, 1958 |
| 2,856,531 | Brouwer | Oct. 14, 1958 |
| 2,867,728 | Pollock | Jan. 6, 1959 |
| 2,901,625 | Friedman et al. | Aug. 25, 1959 |
| 2,936,371 | White et al. | May 10, 1960 |
| 2,984,744 | Lynch et al. | May 16, 1961 |